May 2, 1967  P. R. CALAWAY  3,317,729
SYSTEM FOR DETERMINING MISS-DISTANCE USING
A GAMMA RAY SOURCE AND DETECTOR

Filed May 14, 1963  8 Sheets-Sheet 2

INVENTOR.
PAUL R. CALAWAY,
By His Attorneys
Spensley & Horn

May 2, 1967 P. R. CALAWAY 3,317,729
SYSTEM FOR DETERMINING MISS-DISTANCE USING
A GAMMA RAY SOURCE AND DETECTOR
Filed May 14, 1963 8 Sheets-Sheet 8

FIG. 13. Clock Stop and Readout Delay Control.

FIG. 14. Readout Display Control & Reset 104

INVENTOR.
PAUL R. CALAWAY,
BY HIS ATTORNEYS.
Spensley & Horn.

United States Patent Office 3,317,729
Patented May 2, 1967

3,317,729
SYSTEM FOR DETERMINING MISS-DISTANCE USING A GAMMA RAY SOURCE AND DETECTOR
Paul R. Calaway, Glendale, Calif., assignor to Electronic Specialty Co., Los Angeles, Calif., a corporation of California
Filed May 14, 1963, Ser. No. 280,205
6 Claims. (Cl. 250—71.5)

This invention relates to a distance indicator, and more particularly to such a system employing a gamma-radiation source in one object which may be detected in another to determine their closest separation distance during relative movement.

Accurate separation or miss-distance information is required for analysis of the reliability and accuracy of relatively moving objects, such as practice targets and missiles, and particularly those missiles which utilize a proximity fuse, thus eliminating the necessity for direct hits to destroy or disable the target. For firing practice, when using a drone-type target, a built-in miss-distance factor is sometimes added to the missile's steering mechanisms to prevent a direct hit and the destruction of the target. When the missile comes within this predetermined miss-distance, it is considered to have made a direct hit and the drone is kept intact for the next missile firing.

While expensive and complex targets are thus not destroyed and may be used for repeated missile firing during a firing practice, it is extremely important to know how close the missile approached the target, preferably before the next missile firing mission so that suitable corrective measures may be taken.

Because of the high altitudes and relative speeds between the target and missile, direct visual systems are not practical. Photographic triangulation, acoustical and Doppler-radar systems have been tried, but for the most part have been quite complex, too expensive, require a large power source, are heavy and ineffective for practical miss-distance measurement applications. Moreover, they do not provide for immediate miss-distance information.

More recently, gamma-radiation detection systems have been used for accurately detecting, measuring and indicating rapidly changing radiation intensity levels. The radiation intensity received by a scintillation detector varies with its dstance from the radiation source and this principle forms the basis for scintillation-type detectors.

Unlike most other miss-distance systems, the missile-borne equipment of a radiation miss-distance detection system is simple and inexpensive; consisting of merely a small, activated gamma-ray source. As the missile is generally non-recoverable, a great saving in cost is realized. The activated tag, mounted on the missile, is so small that the missile dynamics are not affected at all by its presence. This means that test missiles can be identical to combat missiles with no expensive modifications necessary. No interference with radar systems or other communication links is experienced when using such a miss-distance indicator. Because of their high energy, the gamma-rays are not affected in any manner by the ionized boundary layer encountered with extremely high-speed vehicles. Also, attenuation from the air between the missile and the target is small. The decay rate of the activated gamma-ray source is completely independent of the missile environment and can be chosen to be very long compared to the duration of a firing mission. Thus, after a static calibration on the ground, the source strength can be considered to be a system constant. The equipment installed in the target can be minimized with the readout equipment mounted in the monitor plane, on the ground, or both. This will also result in a cost reduction in case of a malfunction resulting in the loss of a target. System reliability is also enhanced. Since gamma-ray detection methods are inherently digital (each gamma ray detected results in a single count), the readout problems are reduced. This also increases the system reliability.

One such system employs a source of gamma rays placed in a missile, a detector in the target, and a data reduction system on the ground or in a piloted aircraft for an observer. Output signals are produced by the detector in response to each incident radiation photon and the data reduction system receives the information in the form of pulses. The number of pulses received during a predetermined interval of time are proportional to the radiation intensity which varies according to the distance separating the radioactive source from the detection equipment. This information is then translated into an indication of whether the missile carrying a radioactive source was within the critical destruction distance of the target carrying the detection equipment.

This scintillation-type of scoring system is less costly and less difficult to install and use than other types of scoring systems. For example, most scoring systems using radar techniques incorporate a transponder mounted inside the attacking missile, thereby changing the actual combat characteristics. Complex target-borne equipment is necessary. The ground stations receiving transmission from the transponder equipment in the target involve rather complex and expensive computers.

In scintillation-type scoring systems, a small radioactive tag is installed within the missile; on a ring fitted around the missile, or in a bolthead which is screwed in either a tail fin or some other convenient location. The gamma-radiation emitted from the tag on the missile is then received at the target by a scintillation-type radiation sensor, and no communication link between the missile and the target is necessary in order to recover miss-distance information. The circuitry required in the target-borne detection system typically includes a video amplifier to amplify the pulse information which results from the impingement of the gamma-radiation on a radiation sensor. A pulse-shaping circuit typically is involved and a modulating network for the transmitter for transmission of the pulse data to the ground station. Thus, the cost of installation and maintenance of a radiation-type scoring system, both for missile and target, is substantially less than any of the other types of scoring systems.

Most scintillation-type scoring systems to date receive at the readout station essentially the same type of data input, the data input being in the form of pulse information with the pulse repetition rate being a function of the instantaneous missile tag range from the target-borne sensor. The frequency of the pulses over a predetermined length of time is then transformed into distance information. Thus, these radiation detection systems operate by setting a discrete time interval and measuring or counting the pulses received during that time.

In such a system which samples pulses for a discrete time interval, error due to missile velocity during that time interval is a continually changing factor. During this sample time, the range from the sensor to the missile changes linearly. At the end of the fixed sample time, the range as determined by the number of counts collected is always greater than the actual missile range on an approach. The difference between the actual range and the range as determined from the count rate, assuming negligible statistical error, is the so-called velocity error.

Assuming the missile velocity to be constant, the missile moves the same distance during each sample period. Error due to missile velocity in a constant-sample time system is small at large ranges, but it becomes significantly larger as the missile approaches the target. Therefore, percent error at long range is less than percent error at close range because distance travelled is essentially the same during the sample time.

Another disadvantage in previous scintillation scoring systems lies in the nature of the statistical errors incurred. The accuracy of scintillation scoring systems depend primarily on the statistical nature of the activated gamma source. Since the actual decay rate of a radioisotope is of a random nature, the radiation of gamma rays is not really a constant with time, and with this radiation as a range measuring source, there is a statistical variation in the accuracy of the system. In these previous systems, during a missile pass, the total counts in a constant time interval which indicates minimum range, can vary by a factor of one hundred or more. A radiation count over a period of time converted into distance, then, will not measure distance with a constant statistical accuracy. If the radiation count is extended over a relatively long period of time, the effect of these statistical fluctuations can be reduced to a negligible value. However, over a longer period of time, the velocity error increases. A compromise usually is made between gathering a large sample of gammas and establishing a short enough time base so that the missile range does not change significantly.

The distance indicator comprising the present invention overcomes these defects of earlier systems by operating in a novel manner which permits compensation for the range errors due to missile velocity through instrument adjustment prior to the missile firing. Also, the statistical error is fixed at some known value, thus enabling the operator to be able to establish the same confidence level for all missile firings and miss-distances. This system is based upon a technique of counting a preselected number of pulses and determining the time it takes to receive this number of pulses, the time being a function of distance. The further away the missile is from the target, the longer it takes to count the selected number of pulses. The time to count the same number of pulses is much less than when the missile is closer, so that the percent of error will nearly always be the same. This velocity error, being a constant percentage of the distance, can then be compensated for in the equipment and in this manner greater accuracy can be achieved. The measurement of the time required to count a preselected number of pulses due to the random radiation of gammas, especially after calibration of the system during a sample test before firing practice, makes the system much more predictable than systems which relate the gamma count rate to a fixed time. This is because the gamma count rate is an inverse square function of source range and thus the confidence level and statistical accuracy are extremely difficult to establish with a constant sample time.

The distance indicator system of the present invention, in one embodiment, consists of a radioactive tag placed in the missile, a radiation detector and telemetry device placed in the target and a ground station or station in a monitoring aircraft for converting detection information into distance information. As the missile containing the radioactive tag approaches the target, the rate of impingement of gamma rays on the scintillator crystal in the target increases. The intensity of the impingement of gamma rays is inversely proportional to the square of the range:

$$N = \frac{K}{R^2}$$

where N equals the number of gamma rays/unit time arriving at the detector, R equals the range or separation distance, and K equals a constant. The gamma-ray impingement information is converted to electrical pulses which are telemetered to the ground station where this information is then converted into a readout of the minimum separation distance of the missile from the target.

The system operates on the principle that a preset number of constant-height and constant-width (thus constant-energy) pulses, when integrated, will attain a certain voltage level, and the time required to integrate to this level varies linearly with the count rate. Since the count rate is inversely proportional to the square of the separation distance between the missile and the target, the time duration in charging the integrating capacitor is also proportional to the square of the range.

This time duration is related to a function which produces a second time base which is linear with distance. This is done by first controlling the output from a ramp generator with the aforementioned integrator level by resetting the ramp at the same time the integrating capacitor is reset. The integrator appears as a series of voltage staircase functions of constant peak amplitudes, but with the time bases of the staircase functions of magnitudes which are proportional to the square of the missile-to-target range. The modified ramp wave shape then contains a voltage analog of the missile's approach path to the target. This voltage is stored in a storage network until a readout circuit is activated by a missile path detector. The maximum storage voltage amplitude represents the closest approach of the missile to the target. Making the voltage proportional to the measurable time duration linear with distance requires further transformation.

The missile pass detector, sensing an increase in pulses above a given level generates, after a time delay, a pulse that triggers the readout system and activates a square function generator. The voltage on a capacitor in the function generator is discharged at a rate proportional to the square of time until it is equal to the voltage in the storage network; thus converting the voltage amplitude into miss-distance. In this manner, the time interval until the two voltages are equal is a direct function of the range, rather than a square function as was the integrating time interval. A clock operating during this time interval, is then used to drive a decade display that sums the number of clock pulses and displays it in terms of separation or miss-distance.

It is therefore an object of the present invention to provide a novel distance indicating system based on gamma-radiation detection.

Another object is to provide for a miss-distance indicating system of great reliability and accuracy, yet which is simple and inexpensive to make, install and operate and which is relatively lightweight and compact.

Another object is the provision of a miss-distance indicating system wherein the time required to count a selected number of gamma radiations from an object is proportional to the square of the separation distance of a detector from that object.

Another object of the present invention is the provision of a radiation-type distance detection system for converting the time required to sample a selected number of radiations into an indication of distance.

Another object is the provision of a miss-distance indicating system wherein the magnitude of velocity error is reduced in accordance with separation distance to provide for a constant percent velocity error for which a compensation may be made.

Another object is the provision of a radiation-type distance indicator wherein statistical error due to randomness of radiations is fixed by relating the time to count a selected number of radiations to distance instead of relating the radiation rate to distance.

Yet another object is the provision of a radiation-type distance detection system wherein velocity errors may be calibrated out by adjustment of a voltage ramp slope in sampling radiations before use.

Still another object is to provide a distance indicating system wherein radioactive radiation from a missile is converted into pulses by apparatus on a target and wherein these pulses are collected and used to control a sawtooth waveform to obtain a voltage analog of separation distance.

A further object is the provision of a miss-distance indicating system wherein the shortest separation distance between two relatively moving objects is extracted from a voltage analog of the square of the separation distances which has been stored as a maximum voltage level, and wherein this voltage level may be compared with a square function wave voltage level over a linear time interval; the time interval until equation of said voltage levels being directly proportional to the shortest separation distance.

These and other objects will become apparent as a description of the invention proceeds, having reference to the drawings, wherein.

Figure 1:
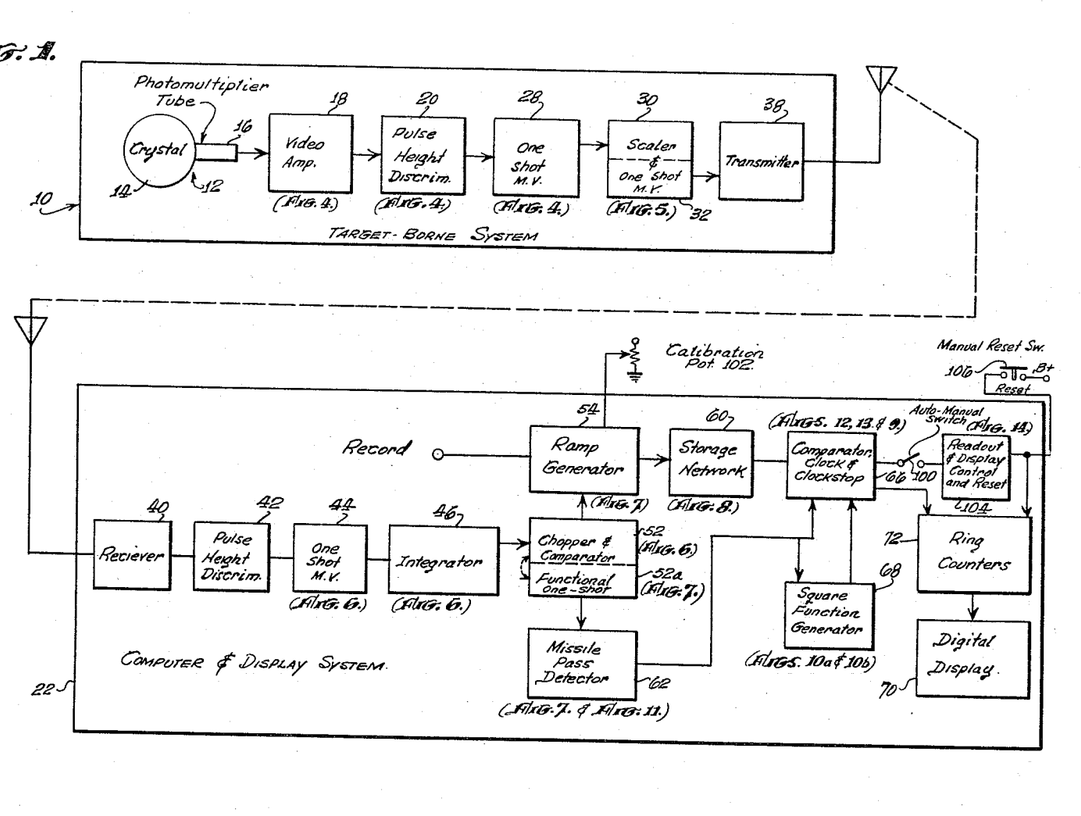
FIGURE 1 is a block diagram of the system.
Figures 2, 3:
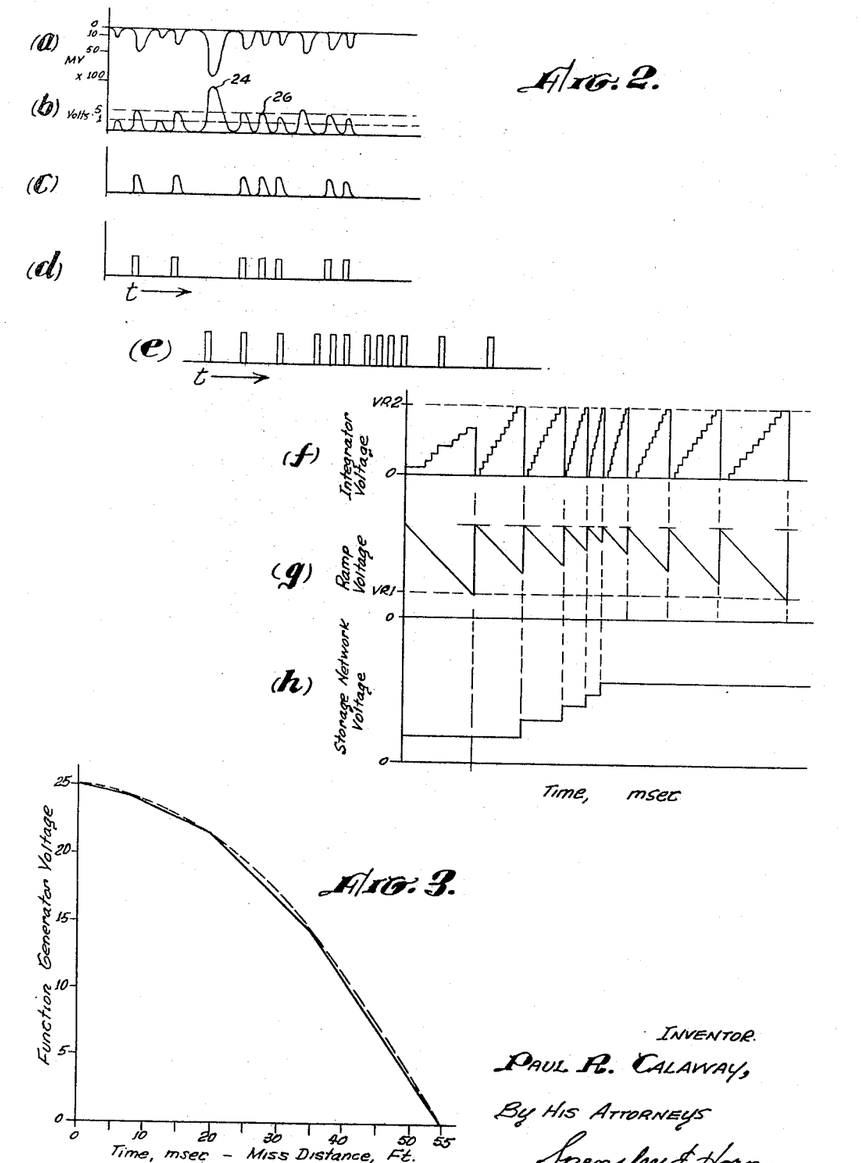
FIGURE 2 shows the principle wave forms utilized in the system.
FIGURE 3 shows a waveform of the function generator.

Referring now to the block diagram in FIGURE 1 with reference to the wave forms in FIGURES 2 and 3, there is shown the target-borne system 10 which operates from a target drone, not shown. Within this system, a radiation detector 12 in one form may consist of a spherical crystal 14 and photomultiplier tube 16. The crystal is preferably of polyvinyl toluene and in one embodiment is on the order of about seven inches in diameter. Each gamma which passes through the crystal excites some number of electrons determined by the statistical considerations. When these electrons return from their excited state to their ground state, they emit photons of light in approximately the 4000 A. region. The outside of the crystal has been coated with a black epoxy paint to prevent the outside ambient light from affecting the photomultiplier tube. The scintillation crystal 14 has been covered on the inside with a light-reflecting substance which allows these light photons to reflect about the crystal until they are received at the photocathode of the photomultiplier tube 16. When these photons impinge upon the photocathode of the phototube, photoelectrons are generated. These electrons are then accelerated through the tube and operate in standard fashion as in all photomultiplier tubes. Both the scintillation crystal 14 and the photomultiplier tube 16 are conventional devices readily available on the market today. Crystals can be typically purchased from Nuclear Enterprises, Ltd. in Winnipeg, Canada, and photomultiplier tubes are available from organizations such as RCA and Dumont. The output from the photomultiplier tube is a negative going pulse of varying amplitude shown as waveform (a) in FIGURE 2. These pulses are the result of three functions:

(1) the signal input caused by the gamma-radiation impinging on the crystal;
(2) inherent tube noise usually of lower level within the photomultiplier tube itself; and,
(3) cosmic radiation, cosmic background which usually results in much greater magnitude pulse heights than the pulses resulting from the gamma radiation. Pulse height from the phototube due to the gamma radiation varies typically from 10 to 50 millivolts.

Figure 4:
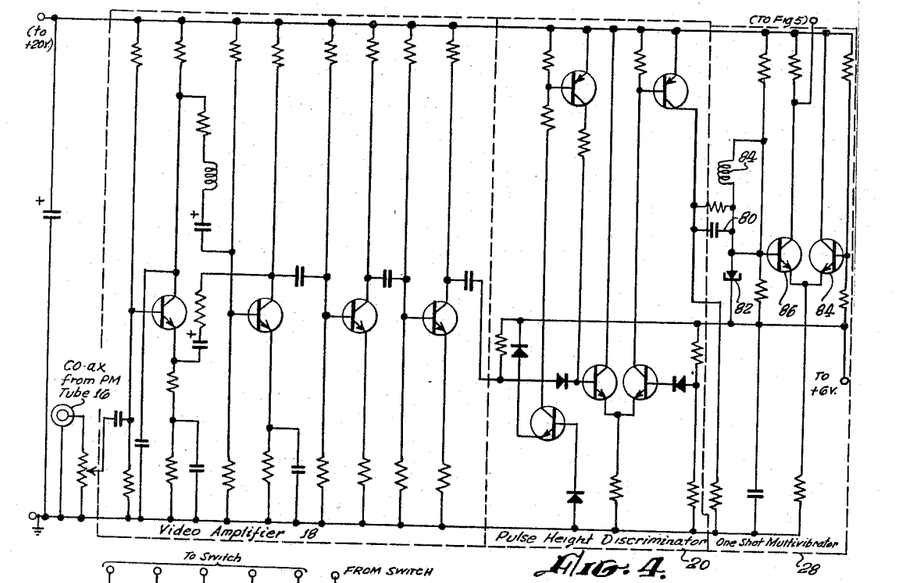
FIGURES 4 and 5 are circuit diagrams of the target-borne system.

The video amplifier 18 employed is of a standard wide-band transistorized type with three stages of gain, resulting in phase inversion, and then an emitter follower to provide isolation between the video amplifier and the following stages. The gain of the video circuitry is approximately 100; therefore, the pulses of interest at the output, shown as waveform (b), are then on the order of 1 to 5 volts and they are positive pulses. The circuit diagram of amplifier 18 is shown in FIGURE 4.

The output from the video amplifier 18 passes to a pulse height discriminator 20. The discriminator in effect establishes a voltage window which eliminates the pulses above a preset height and also below another preset level, as shown by waveform (c). This is done for the following reasons: The low-level tube noise described earlier can cause degradation of the system accuracy by appearing to the computer and display system 22 as a gamma count. In addition, the cosmic radiation level which varies by a factor 10 from sea level to 50,000 feet altitude will also degrade the accuracy of the system for the same reason. These pulses, due to cosmic radiation, as mentioned earlier, are typically much greater than the pulse due to a gamma photon impinging on a scintillation crystal. Pulse 24 may be compared with pulse 26 as an example. Therefore, a window was selected which will accept all pulses between approximately 1 volt and 5 volts, this level being established in this embodiment as those pulses caused by the reaction between a gamma photon and the scintillation crystal 14. By operating this window, some of the signal will be lost since there is a finite, although small, probability that one of the low-level or one of the extremely high-level pulses is a result of a gamma reaction. However, the advantages to be gained by eliminating the noise more than offsets the disadvantage of losing some of the signal with this type of network. The circuit diagram of the pulse height discriminator is shown in FIGURE 4.

The output from the pulse height discriminator 20 is then fed into a one-shot multivibrator 28. This one-shot multivibrator is of the tunnel diode variety and is quite unique in that it can provide an extremely high pulse repetition rate and maintain a stable pulse height and pulse width. Pulse repetition frequencies of 3 megacycles are typical in this circuit, the diagram of which is shown in FIGURE 4. The reason for driving the one-shot multivibrator 28 is to provide a pulse of constant-height and constant-width for each pulse which passes through the pulse height discriminator 20. Thus, one constant-energy pulse is recovered for each gamma which reacts with the scintillation crystal 14 in the beginning of the system. These pulses, shown as (d) in FIGURE 2, are then much easier dealt with in the following circuitry.

These pulses from the one-shot multivibrator 28 are then fed into a scaling network 30. The reason for this scaler is strictly to divide down the pulse rate for telemetering of the data by the target-borne transmitter. This technique enables the system to handle higher gamma photon count rates from larger radioactive tags and still remain within standard IRIG telemetering band width. The IRIG standards define telemetering characteristics for all U.S. military installations, including telemetering band width, pulse repetition rate, frequency stability, spurious responses, etc. IRIG is the abbreviation for the Interrange Instrumentation Group which group is located in White Sands, New Mexico, and sets standards for Data Transmission and Reception in Missile Ranges.

A second one-shot multivibrator 32 is provided at the output of the scaler 30 to provide a constant-height, constant-width pulse for a preset number of pulses into the scaler network due to the gamma reaction. The scaler network can be described as follows: The output from the first one-shot multivibrator 28 drives a constant-current generator 34 during the pulse duration. The output from this constant-current generator then places a fixed amount of charge on an integrating capacitor 36 for each pulse driving the generator. When the voltage on the capacitor 36 reaches a preset level, a network is activated which shorts this capacitor and it begins to count again. Upon shorting, a pulse is generated which drives the second one-shot multivibrator 32. By adjusting the amount of current from the constant-current generator 34 for each input pulse, different division factors are obtainable. This sensor system provides five preset division factors which can be obtained by merely plug-in means or by rotation of a switch, not shown. These factors have been set to be 3, 5, 10, 15 and 20, enabling the system to operate at minimum ranges for tag strength ranging from less than 5 millicuries to more than 100 millicuries of Antimony 124, or its equivalent. These numbers identify switch positions in FIGURE 5.

The output from the second one-shot multivibrator 32 modulates a telemetering transmitter 38. This transmitter is a standard airborne solid state transmitter which is readily available and performs the conventional function of transmitting pulses. One such typical transmitter is marketed by Electronic Specialty Co., Los Angeles, Calif. The scaling network 30 is permanently adjusted so that for a given tag strength at minimum missile range, the pulse repetition rate to the transmitter 38 is never more than approximately 30 kc. with pulse width of approximately 10 microseconds.

The pulse formation from transmitter 38, such as pulses shown as waveform (e) in FIGURE 2, is recovered from a standard telemetering receiver 40, such as Nems-Clark Model No. 1455A, and is thus fed into the computer and display system 22. This system can be packaged in three possible configurations in order to provide optimum usage:

(1) a 19" rack configuration for a permanent installation;
(2) a portable transit case which is provided with a water-tight cover for work in remote locations;
(3) a combination of a computer module and a readout module which is mounted in an airplane cockpit so that the scoring information is available during flight.

Figure 6:
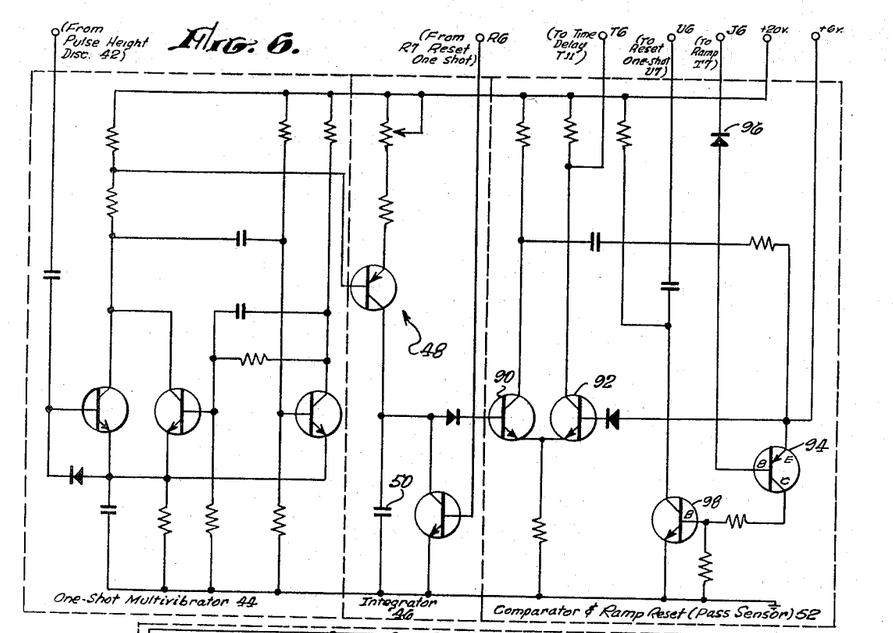
FIGURES 6 through 14 are circuit diagrams of various portions of the data processing and readout system.

The pulse data from the receiver 40 is fed into a pulse height discriminator 42 in order to eliminate any noise which may be generated within the receiver 40 or in the data link between the receiver and the computer. This is especially useful when operated with the cockpit readout unit because of the amount of radio noise generated by the rotating machinery, generators, etc., within the aircraft. Suitable scopes and recorders (not shown) may be connected at this point for display or retention of the received signal. These pulses then drive a one-shot multivibrator 44, also of conventional design, as shown in FIGURE 6, in order to provide pulse reshaping in the event that there is some degradation of the pulse shape by a transmitter or the receiving equipment. The output from the one-shot multivibrator is a constant-height, constant-width pulse, similar to the transmitted pulses in waveform (e) to provide a convenient operation in the later circuitry.

The output of the one-shot multivibrator 44 is fed into an integrating network 46. This network, shown in FIGURE 6, consists of a constant-current generator 48 which places a constant amount of charge on an integrating capacitor 50 for each pulse from the receiving system. When the integrator reaches a preset level, shown as VR2 in waveform (f) in FIGURE 2, corresponding to a preset number of pulses received at the receiver 40, a comparator network 52 senses this voltage and shorts out the capacitor, clearing the integrator for counting again. The time required for the integrator to count, or build up a voltage to a given preset level is then proportional to the gamma-count rate received at the target-borne sensor system.

Figure 7:
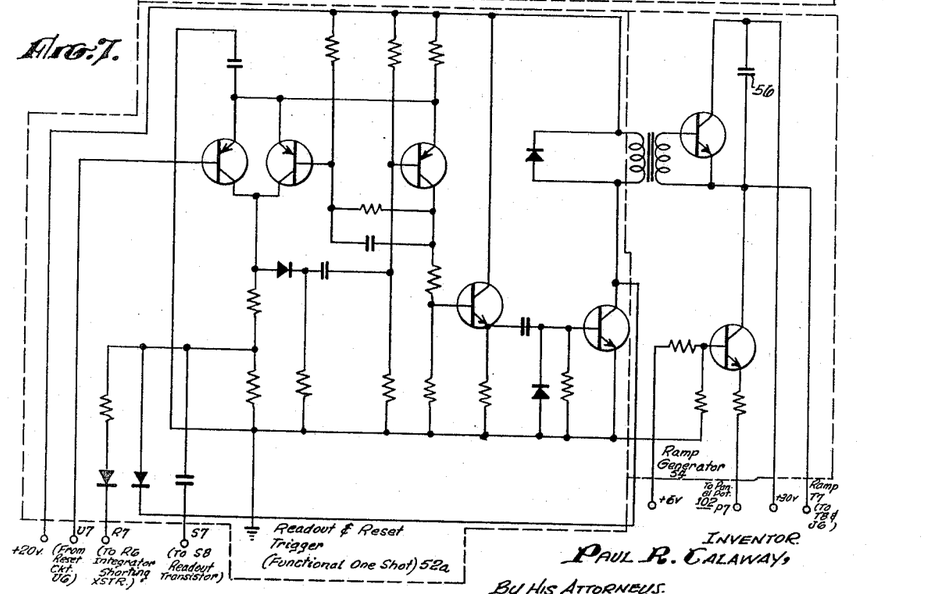

It is desirable to be able to obtain a voltage inversely proportional to the fastest time-to-count in a series of such counts for later data reduction since the time of the fastest charging of the capacitor 56 indicates the closest miss-distance. (By "later" is meant on the order of 100 milliseconds.) In order to provide this function, a number of operations occur simultaneously. First, the integrator 46 integrates the incoming pulses for a time dependent upon the gamma photon count rate. During the time that this integrator is collecting counts, a second function is being performed by a ramp generator 54, whose circuit is shown in FIGURE 7. This generator is developing a linear ramp of constant predetermined slope (constant-negative slope). This is done by discharging a capacitor 56 from a predetermined voltage level with a constant-current drain. The voltage on the ramp capacitor 56 provides, at the time that the integrator network reaches its present level, shown as VR1 in waveform (g) of FIGURE 2, the desired relationship between the count rate and a positive, storable voltage. The storage network 60 produces an output signal whose level is determined by the level of the ramp voltage, just prior to reset, which is dependent on the time-to-count to the preset number shown in waveform (f) in FIGURE 2. When the preset number of counts is received and the integrator is shorted, a pulse is generated which first samples the ramp voltage and stores that voltage in the storage network, and resets the ramp function also. The voltage on the ramp capacitor 56 at the time of reset is directly proportional to the gamma-count rate. This is illustrated by waveform (g) in FIGURE 2.

Figure 8:
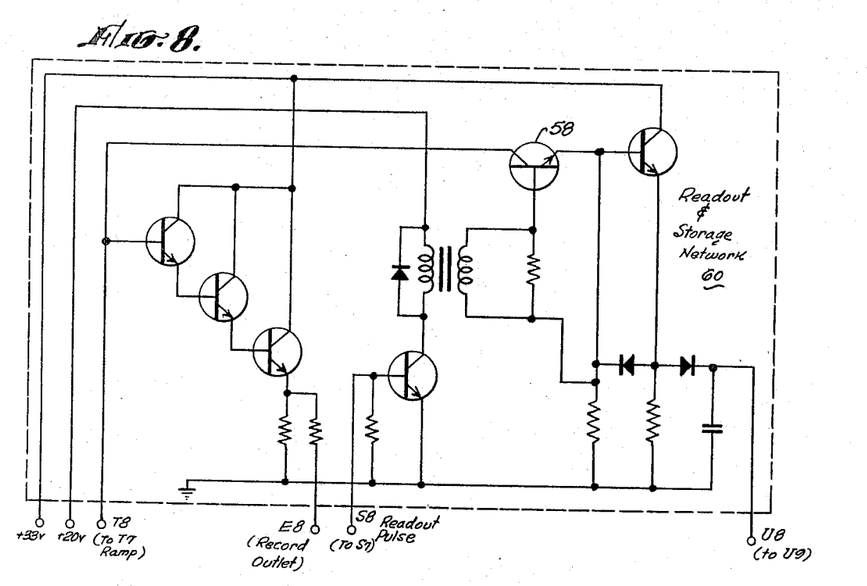
Figure 9:
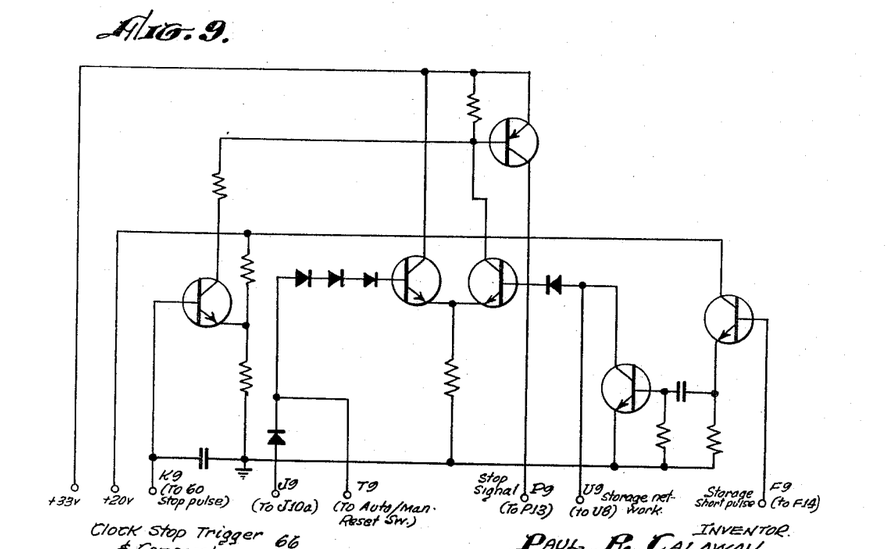
Figure 10:
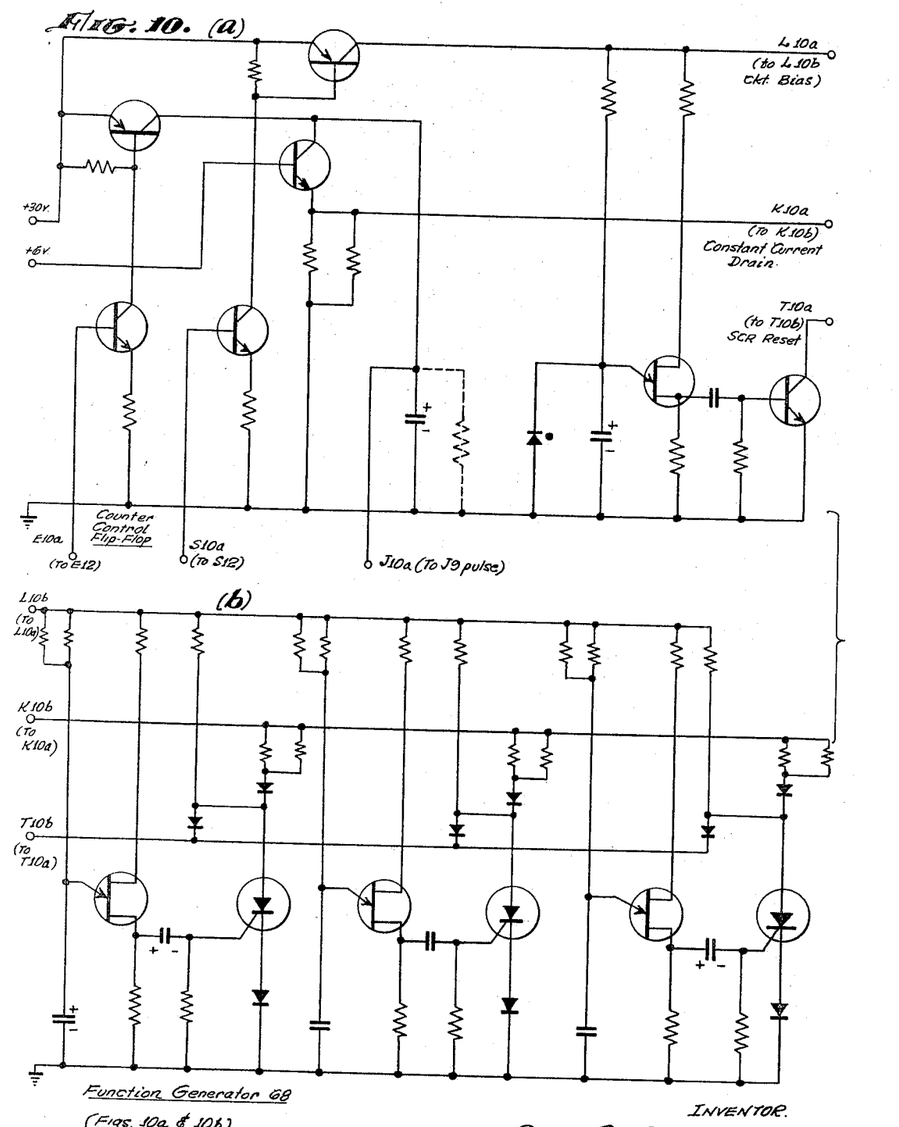

The ramp and integrator functional operation at the time that the integrator reaches its preset level VR2 may be explained in another way. A comparator 52 senses when the integrator 46 reaches this level and generates a pulse which activates a one-shot multivibrator 52a within the chopper-comparator network. This one-shot pulse serves three separate functions. The leading edge of the one-shot pulse is used to provide a signal to short the integrator 46 and also turn on a readout transistor 58, in FIGURE 8, which transfers the voltage on the ramp generator 54 at that time into a storage network 60, whose circuit is shown in FIGURE 8. This so-called gating transistor 58 turns off before the end of the functional one-shot pulse so that the trailing edge of the pulse can be used to reset the linear ramp to its initial peak voltage. The typical pulse width for the triggering one-shot pulse is 50 microseconds, the gate transistor 58 which transfers the voltage from the ramp generator 54 to storage network 60 is typically opened for 20 to 30 microseconds. In this way, the storage capacitor 56 continually sees the last voltage on the ramp before it resets to its original value. Thus, during a missile pass, this storage voltage will rise in a step fashion, as shown by waveform (h) in FIGURE 2, and will hold at the maximum voltage level seen at the base of the ramp, shown in waveform (g), the maximum level being proportional to the instantaneous sampled gamma-count rate.

In order to provide ease of calibration and help eliminate noise from the system, an automatic reset function has been provided in the ramp generator 54. When the voltage on ramp capacitor 56 reaches a given preset discharge level, a signal from the comparator circuit 52 is generated which operates the functional one-shot multivibrator 52a, thereby shorting or resetting the integrator 46, transferring the instantaneous ramp voltage to the storage network 60, and resetting the ramp generator 54. Thus, if the gamma-count rate is so low that the integrator does not reach the preset level before the ramp reaches its bottom point, the system is reset and a new sample is taken. The ramp incline or slope is adjustable for calibrating voltage amplitude with miss-distance, as will be explained later. However, this ramp voltage never goes below VR1 in waveform (g). If, however, the gamma-count rate reaches a point that the integrator upper level VR2 is reached before the ramp reaches its automatic reset point VR1, the presence of a radioisotope within the scoring range of the system is indicated. At that time, the following functions occur: When the count rate reaches such a level that the system is reset by the comparator network 52 rather than the automatic ramp reset function in ramp generator 54, a pulse is generated within the comparator 52 which passes to the missile pass detector 62 which starts a time delay. The time preset into this time delay is arbitrary but is made long compared to the time required for the slowest anticipated missile to pass through the largest anticipated scoring sphere. During this time, the storage network 60 sees a series of step increases in the bottom ramp voltage as the missile approaches. This is shown in waveform (g). At the end of this time delay, it is assumed that the missile has passed through the maximum and is progressing away from the target and the count rate is decreasing. Therefore, the storage network is at its peak, as shown in waveform (h). This time delay is typically 150 milliseconds.

Figure 12:
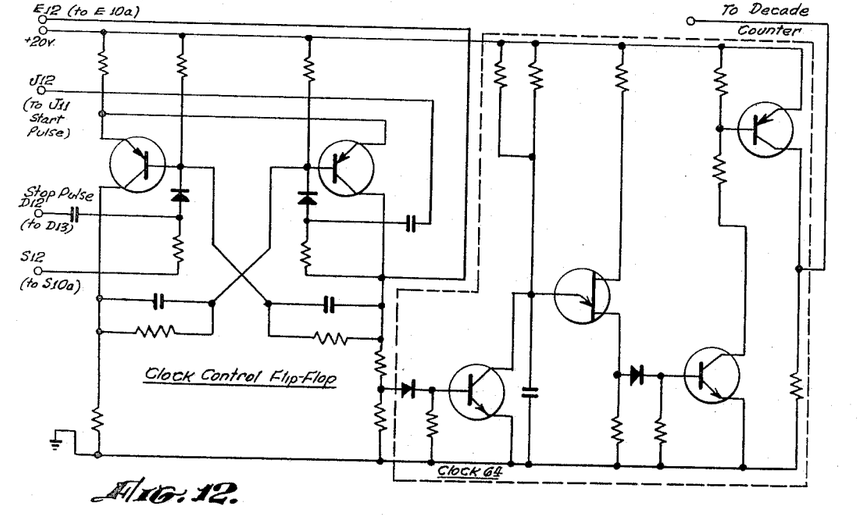
Figure 13:
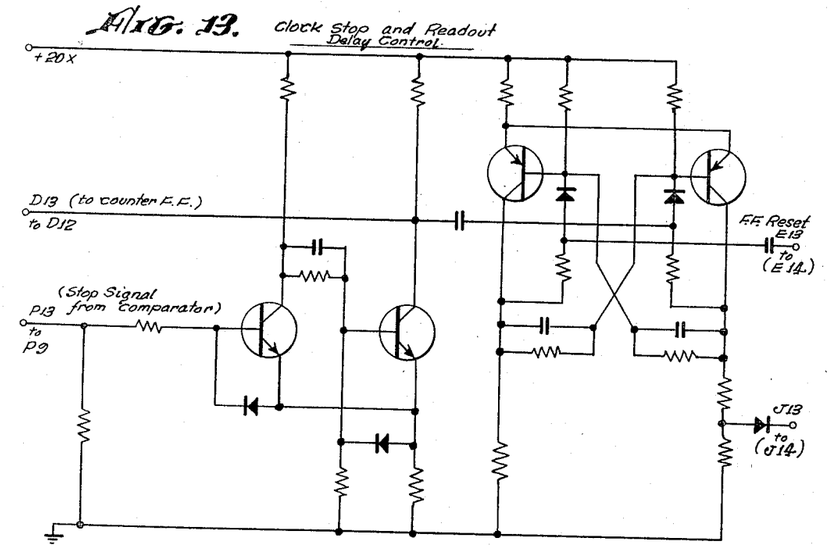

If, and only if, voltage VR1 in waveform (g) is not reached by the time the predetermined voltage VR2 in waveform (f) is reached, the time delay is activated. At the end of this time delay, a pulse from the missile pass detector 62 is generated which starts a clock 69 in FIGURE 12, running at a calibrated 1 kc. rate. This clock drives a decimal readout network in the digital display 70, to be described later. This pulse also actuates the function generator 68. This function generator is a series of linear voltage ramps calibrated to approximate an inverse parabolic shape, such as is shown in FIGURE 3. The slope of each linear ramp and the break points (the point where the slopes of the linear ramp changes) have been calibrated to coincide with the 1 kc. counter 64 which is running. During the time that this function generator 68 is operating and the counter 64 is counting, the instantaneous voltage on the function generator 68 is being compared with the voltage in the storage network 60. At the time that the two voltages are equal, the counter is stopped and the function generator is reset to its stand-by value. In this fashion, the square root of the storage network voltage is taken and the number of pulses from the 1 kc. clock is exactly equal to the missile miss-distance.

The display network consists of two decades of standard silicon control rectifier (SCR) ring counters 72 with the second decade depending on a pulse from the tenth SCR in the first decade for its counting pulse. The 1 kc. generator described earlier is the counting pulse for the first decade. These SCR's have as their load in the circuit a 28-volt light bulb which provides the illumination to display the proper number. The display units, including the lights for illuminating the characters, are produced by Interstate Electronics Corp., North Hollywood, California.

Figure 5:
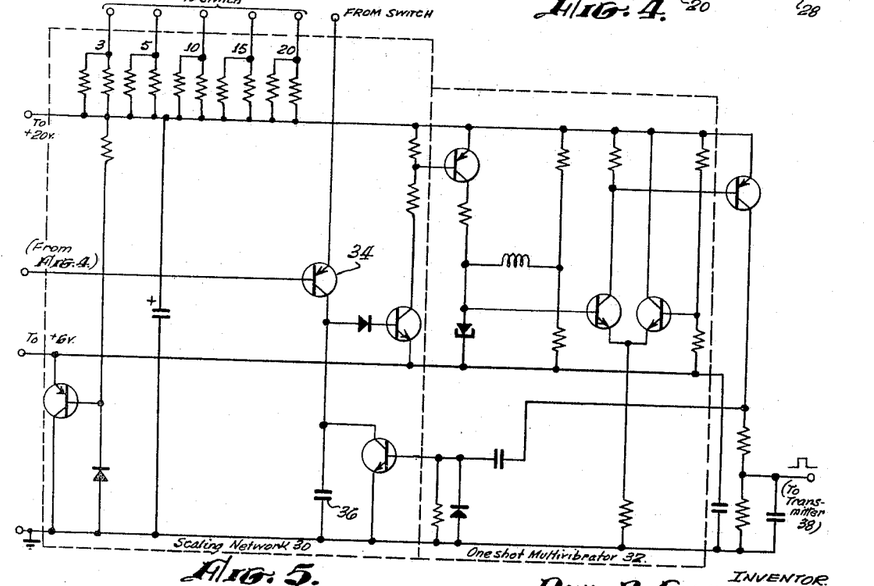

One of the novel circuits of the system is shown in FIGURE 4. This is the circuit diagram of the high speed one-shot multivibrator 28 in the target-borne system. A positive current pulse is coupled through capacitor 80 causing tunnel diode 82 to exceed its peak point current and enter its negative resistance region. Tunnel diode 82, previous to application of the pulse, is biased in a low voltage state. The duration of time that the tunnel diode is held in this negative resistance region is determined by the size of inductor 84. When the current pulse from capacitor 80 reduces to zero and the voltage across inductor 84 then returns to zero, tunnel diode 82 returns to its original state. Pulse height from tunnel diode is on the order of 50 millivolts; too small for operation of circuitry in the next stage of the system. The base of transistor 84 is biased from a highly regulated 6-volt supply just slightly above the biased base of transistor 86 and therefore transistor 84 conducts. When the pulse from capacitor 80 causes the tunnel diode 82 to enter the high voltage state, the voltage at the base of transistor 86 exceeds that of the base of transistor 84 and transistor 86 then begins to conduct. A pulse is then generated of much greater magnitude than that resulting from the tunnel diode itself and a great deal of gain is effected. This one-shot circuit takes advantage of the extremely high frequency capabilities of the tunnel diode one-shot and still provides sufficient keying and stability to operate circuitry in the system. The one-shot multivibrator 32 in FIGURE 5 is functionally the same as the one just described.

Figure 11:
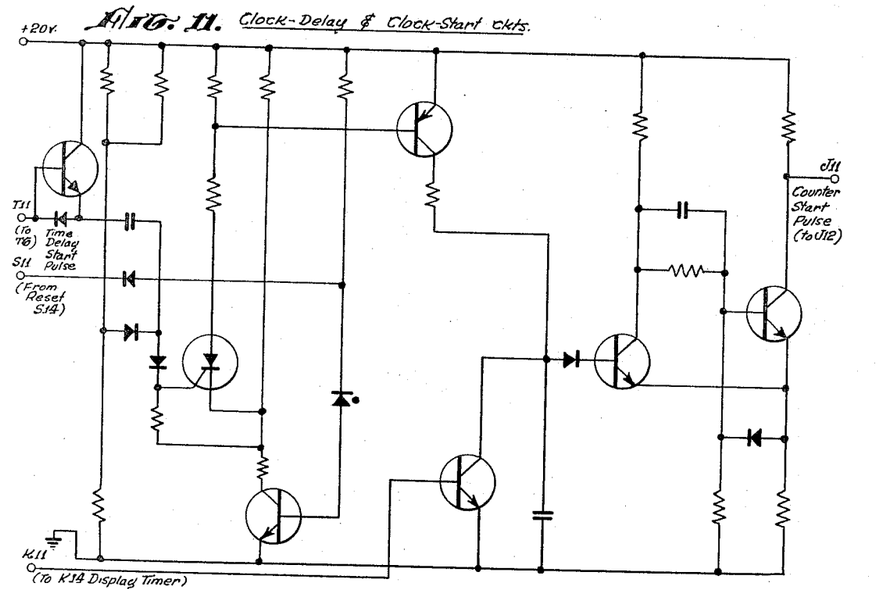

Another important feature of this invention is the missile pass detector 62 which may be termed the "when" circuit. It produces a signal to tell comparator 52 and square function generator to operate after the missile has passed so that the closest point may be read out. The time delay provided by detector 62 tells the system when to read out and thus serves to produce a signal indicative of the closest point, which is the basic function that the entire system is to perform. The operation of missile pass detector 62 may be better understood with reference to FIGURE 6, showing the circuit diagrams of multivibrator 44, integrator 46, and the comparator and ramp reset 52. Transistors 90 and 92 comprise a comparator, one side of which samples the incoming integrator voltage from capacitor 50; the other side of the comparator is biased at a regulated six volts. Transistor 94 is biased such that its emitter looks at the plus six volts and its base looks at the ramp voltage from terminal J6 with a drop of approximately 7/10 of a volt through diode 96. When the ramp voltage reaches a point designated the automatic reset point, transistor 90 becomes forward biased, and current flows through its collector. This current flows into the base of 98 which has been biased in an off condition and it begins to conduct; thereby triggering the functional one-shot pulse described earlier. This functional one-shot pulse shorts the capacitor in the integrator 46, opens the storage gate transistor and resets the ramp. No readout is effected. When the count rate reaches a level such that the comparator senses that the base of transistor 90 is biased higher than the base of transistor 92, before transistor 94 conducts, a condition exists that a missile is approaching the sensor. Transistor 90 then begins to conduct and transistor 92 turns off, coupling a pulse through pin T6 to the time delay in FIGURE 11. Thus, only when the integrator level reaches the preset value before the ramp reaches its automatic reset point, then and only then does a pulse generate from the pass detector to affect a readout. All other times, the integrator is shorted, the ramp is reset and held in a steady state fashion and no readout occurs.

Figure 14:
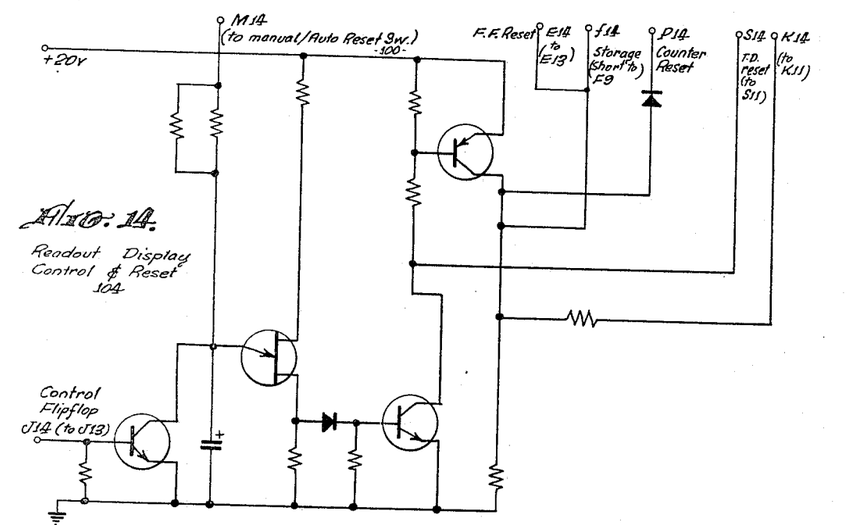

Another unique feature of the present invention is the ease of calibration of the system to accommodate radiation sources of different strengths. Calibration is affected in the following manner: A radioactive tag which is equal to that tag to be mounted on the missile is placed a specified distance from the sensor at some time prior to the mission time. The miss-distance computer is set on an automatic position 100 by a switch on the front panel of the unit. Also provided on the front panel is a potentiometer 102. This miss-distance indicator samples the count rate, extracts the actual miss-distance, displays for a few seconds a readout of this distance, resets the system, counts again and displays the information again. This operation is controlled by the Readout Display Control and Reset Network 104 shown as the unijunction transistor timer network in FIGURES 12 and 14. During the time that the system is automatically displaying, adjustment of the front panel potentiometer 102 will adjust the miss-distance readout until the system continually reads out the proper range within the statistical accuracy and confidence levels specified. A single calibration point, that is only one position of the tag, is sufficient to provide calibration for the entire range of the scoring sphere. Once this calibration has been effected, the system is set on a manual mode and the operation can be commenced. In the manual mode, once a missile has passed and the distance readout in accordance with the calibration sampling, the display will hold this miss-distance information until released by a push-button 106 located on the front panel and operated by the observer. The adjustment of the potentiometer on the front panel during calibration simply changes the slope of the linear ramp function. As this slope is changed for a given count rate from the radioisotope, the final voltage on the ramp function at the time that the preset voltage is obtained on the integrator changes. Thus, if the slope is increased without moving the position of the radioisotope from the sensor, the final voltage on the ramp for storage is less than for the previous value of slope. When the function generator then is activated, it runs for a longer time before the voltage on the function generator equals that voltage which has been stored. Therefore, the counter runs for a longer time and a higher number is read out on a digital display. If the slope is decreased, the voltage in the storage network will be higher, the counter will run for a shorter time and the readout will display a smaller number. Thus, if the system has been previously calibrated for one tag strength and a stronger tag is placed at the same range, the system will read out a smaller number and the slope must be increased on the linear ramp in order to readout the proper range. If a smaller tag is used, the slope must be decreased in order to read out properly. The function of the potentiometer in the circuit merely changes the rate at which the current is drained from the ramp capacitor; thus changing the slope of the linear ramp.

If errors in the system readout due to the velocity of the missile are too large to be acceptable, the following biasing technique can be employed: The above description of the system calibration shows that a change in the slope of the linear ramp function affects a linear change in the system readout. Therefore, if an error in range due to velocity is known, and it is required that this be eliminated prior to the firing, the system can be calibrated with a radioactive tag to read proper ranges and then a fixed change can be effected in the slope to compensate for this linear error induced by missile velocity. This can be done with the present system because of the fact that the error due to velocity is nearly a constant for any missile range. If it were not, a linear change in the ramp function slope would not compensate completely, but would only compensate at some point. This biasing technique can be implemented with a three-position switch. For example: the first position would be the calibration point; the second position would bias the ramp for medium approaching velocities; and the third position for high approaching velocities. This would enable the operator to maintain the velocity error below some preset level for any missile attack pattern.

While I have herein shown and described certain specific details for the purpose of illustrating the underlying principles of this invention and its application, it is to be understood that variations and modifications therefrom will occur to those skilled in the art and that such departures are intended to be within the spirit of the invention as claimed.

What is claimed is:

1. A miss-distance indicator system for detecting the proximity of one object to another, comprising:
    (a) a source of gamma radiation positioned on one object;
    (b) radiation detection means on the other object, said detection means developing electrical pulses in response to gamma radiation received thereby; circuit means for producing pulses of constant height and width from said detection means pulses;
    (c) means integrating said circuit means pulses to a preset voltage level;
    (d) means for measuring the time of integrating said circuit means pulses to said preset voltage level; and,
    (e) means for converting such time interval measurement into separation distance information.

2. A miss-distance indicator system for detecting the proximity of a missile to a target, comprising:
    (a) a source of gamma radiation on said missile;
    (b) radiation detection means on said target, said detection means producing electrical pulses in response to said radiation; circuit means for producing pulses of constant height and width from said detection means pulses;
    (c) means integrating said circuit means pulses to a preset voltage level;
    (d) means for measuring the time of integrating said circuit means pulses to said preset voltage level; and,
    (e) means for converting such time measurement into separate distance information.

3. A distance indicating system for indicating distance to a pulse producing target comprising:
    (a) means for receiving pulses;
    (b) means for counting a predetermined number of said pulses;
    (c) means for measuring the time interval required to count said predetermined number of pulses, whereby said measurement is inversely proportional to the square of the distance to said target;
    (d) circuit means for converting said measurement into an electrical signal directly proportional to the distance to said target, said circuit means including,
        means generating a sawtooth voltage waveform of uniform peak height and of uniform declining slope,
        means storing voltage pulses of amplitude determined by the sawtooth voltage waveform height at the end of said time measurement,
        means generating a square function voltage and comparing said square function voltage with the voltage of said stored voltage pulses,
        means for measuring the time required to equate said voltages,
        means for converting said equating time measurement to an electrical output signal; and,
    (e) readout means for converting said output signal to distance information.

4. A missile distance indicator system for detecting the closest proximity of a missile to a target comprising:
    (a) a source of gamma ray radiation of known activity;
    (b) radiation detection means developing an electrical signal pulse in response to each received gamma ray;
    (c) means for counting a predetermined number of said pulses;
    (d) means for selecting the shortest necessary time interval for receiving a sufficient number of said gamma rays to produce said predetermined number of said pulses;
    (e) means for measuring said time interval selected by said time selecting means;
    (f) means for converting said time measurement to distance information;
    (g) said time selecting means including means for providing a voltage analog of a missile approach to the target, and means integrating said voltage analog and storing the resultant voltage whereby the maximum voltage amplitude represents the shortest distance of said missile from said target; and,
    (h) said time measurement means including means for generating a declining function voltage, means comparing said voltage amplitude and said function voltage amplitude, and means noting the time interval required for said function and stored voltages to become equal.

5. A miss-distance indicator system as in claim 4, including a missile pass detector means for sensing the approach of a missile; and,
    means starting the comparison of stored and function voltages a predetermined time delay thereafter.

6. A missile distance indicator system as in claim 4 wherein the means converting time interval information into distance information comprises counter means generating pulses from the starting time for the comparison of said voltage amplitudes until said voltages are equal; and, a display system that sums the number of pulses thus counted and displays them in numerical form.

References Cited by the Examiner

UNITED STATES PATENTS

| 2,987,621 | 5/1961 | Mielziner | 250—71.5 |
| 2,992,422 | 7/1961 | Hages | 343—12 |
| 3,091,463 | 5/1963 | Cohen | 250—71.5 X |
| 3,141,977 | 7/1964 | Fratanturro | 250—106 |
| 3,167,652 | 1/1965 | Weisbrich | 250—71.5 |

ARCHIE R. BORCHELT, *Primary Examiner.*

JAMES W. LAWRENCE, RALPH G. NILSON,
*Examiners.*